(12) United States Patent
Aalipour Hafshejani et al.

(10) Patent No.: US 11,762,871 B2
(45) Date of Patent: Sep. 19, 2023

(54) METHODS AND APPARATUS FOR REFINING A SEARCH

(71) Applicant: Walmart Apollo, LLC, Bentonville, AR (US)

(72) Inventors: Ghodratollah Aalipour Hafshejani, San Jose, CA (US); Arpit Sharma, Santa Clara, CA (US); Sahana Radhakrishna, San Bruno, CA (US); Haoxuan Chen, Mountain View, CA (US); Tanmay Peter Kuruvilla, Sunnyvale, CA (US); Phani Ram Sayapaneni, Sunnyvale, CA (US); Kotlasanthos Kumar, San Bruno, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 330 days.

(21) Appl. No.: 17/163,087

(22) Filed: Jan. 29, 2021

(65) Prior Publication Data

US 2022/0245136 A1    Aug. 4, 2022

(51) Int. Cl.
| | |
|---|---|
| *G06F 16/248* | (2019.01) |
| *G06F 16/242* | (2019.01) |
| *G06Q 30/0601* | (2023.01) |
| *G10L 15/30* | (2013.01) |
| *G06F 40/30* | (2020.01) |
| *G10L 15/22* | (2006.01) |
| *G10L 15/18* | (2013.01) |
| *G06F 40/279* | (2020.01) |

(52) U.S. Cl.
CPC .......... *G06F 16/248* (2019.01); *G06F 16/243* (2019.01); *G06F 40/279* (2020.01); *G06F 40/30* (2020.01); *G06Q 30/0613* (2013.01); *G10L 15/1815* (2013.01); *G10L 15/22* (2013.01); *G10L 15/30* (2013.01)

(58) Field of Classification Search
CPC .... G06F 16/243; G06F 16/248; G06F 40/279; G06F 40/30; G06Q 30/0613; G10L 15/1815; G10L 15/22; G10L 15/30
See application file for complete search history.

(56) References Cited

U.S. PATENT DOCUMENTS 9,165,028 B1 *  10/2015  Christensen ........ G06F 16/3322
10,235,996 B2   3/2019   Renard et al.
(Continued)

FOREIGN PATENT DOCUMENTS

| EP | 3594828 | 1/2020 |
| WO | 2017044257 | 3/2017 |
| WO | 2017213684 | 12/2017 |

*Primary Examiner* — Eric Yen
(74) *Attorney, Agent, or Firm* — Morgan, Lewis & Bockius LLP; Manita Rawat (57) ABSTRACT

The disclosed subject matter relates to a system and method for providing an automated assistant that retrieves information from a knowledge base in response to a user's natural language communications. A refinement signal based on a subsequent user communication relevant to a previous search, establishes the type of search to be performed by the automated assistant in generating a response to the user communications. A reply communication to the user includes the selected results from search type selected. The types of searches are SPECIFIC, RELATIVE and NEGATION searches.

20 Claims, 5 Drawing Sheets

(56) References Cited

U.S. PATENT DOCUMENTS

| | | | |
|---|---|---|---|
| 2010/0057687 A1* | 3/2010 | Shen | G06Q 30/0241 |
| 2012/0096030 A1* | 4/2012 | Kim | G06F 16/3349 |
| | | | 707/E17.014 |
| 2016/0140228 A1* | 5/2016 | Cohen | G06F 16/951 |
| | | | 707/708 |
| 2016/0196820 A1* | 7/2016 | Williams | G10L 15/1822 |
| | | | 704/244 |
| 2017/0068670 A1 | 3/2017 | Orr et al. | |
| 2018/0268818 A1 | 9/2018 | Schoenmackers et al. | |
| 2018/0336894 A1 | 11/2018 | Graham et al. | |
| 2019/0065556 A1* | 2/2019 | Kumar | G06F 16/3329 |
| 2020/0278842 A1* | 9/2020 | Shihab | G06F 40/30 |
| 2020/0311349 A1* | 10/2020 | Balasubramanian | G06F 40/216 |
| 2020/0334307 A1* | 10/2020 | Prasad | G06F 16/9535 |
| 2023/0024507 A1* | 1/2023 | Bhattacherjee | G05B 19/188 |

\* cited by examiner

METHODS AND APPARATUS FOR REFINING A SEARCH

TECHNICAL FIELD

The disclosed subject matter relates generally to automated assistants providing information from a database to a user in response to a plural user communications. Specifically, an automated shopping assistant providing relevant products to the user based on successive user inquiries/communications.

BACKGROUND

In recent years, with the development of cognitive intelligence technology, the success rate of speech recognition has been greatly improved, and applications based on speech recognition as well as natural language processing have also been comprehensively promoted. In addition to basic applications such as voice input, voice-based and text-based human-computer interaction applications such as voice and online assistants (i.e. automated assistants) have gradually become the standard configuration of intelligent systems. Such assistants can allow users to interact with devices or systems using natural language in spoken and/or text forms. For example, a user can provide a speech input containing a user request to an automated assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

In the prior art, the voice assistant is usually used in conjunction with the knowledge base. The front end first recognizes the user's voice input, converts the voice information into text information, and then queries in the knowledge base, and then matches the query with the voice content.

Intelligent automated assistants can provide an intuitive interface between users and electronic devices. Furthermore a digital assistant can be utilized to assist with searching for consumer products and/or there attributes. However, users are often not clear with regard to the specific products they are seeking and may spend a considerable amount of time browsing products related to the desired product, before finding a product that meets the user's requirements. Further, existing search interfaces can be complicated and not user friendly, which can further increase the time a user spends browsing unwanted products before ultimately selecting a desired item. Thus there is a need in the art to more efficiently refine the results of a user's search.

SUMMARY

The embodiments described herein are directed to a system and method for retrieving information from a knowledge base in response to a user's natural language question, specifically with an automated shopping assistant. In addition to or instead of the advantages presented herein, persons of ordinary skill in the art would recognize and appreciate other advantages as well.

In accordance with various embodiments, exemplary systems may be implemented in any suitable hardware or hardware and software, such as in any suitable computing device.

In some embodiments, a system for retrieving relevant information from a knowledge base in response to successive user natural language communications is described. The system including a communication system; a database containing the knowledge base; and a computing device connected to both the database and the communication system, the computing device being configured to receive a first natural language communication from the user indicative of the user's request from the communication system and extract a first intent and first entities from the first communication. The computing device also configured to perform a first query of the database based upon the extracted intent and entities and receive information from the database in response to the query; and, transmit a reply communication to the user, based upon the received information over the communication system. Additionally, the computing device is configured to receive a second natural language communication from the user; extract a second intent and second entities; generate an action signal from the second entities; and perform a second query based on the previous query, the current (second) intents and entities and the action signal. The computing device further receives a second set of information from the database based upon second query; and, transmits a further communication to the user based upon the second set of information.

In some embodiments, a method refining response information relevant to plural user natural language communications is also provided. The method including receiving a first natural language communication from the user indicative of a user's request; extracting a first intent and first entities from the user's first communication with a natural language processor. The method further performing a first query of a database based upon the extracted intent and entities; receiving information from the database in response to the query; and transmitting a reply communication to the user over a communication system, the reply communication based upon the received information. The method also includes receiving a second natural language communication from the user; extracting a second intent and second entities from the second communication with the natural language processor; generating an action signal from the extracted second entities; and performing a second query on the database based the first query, second intents and entities and the action signal. Upon receiving a second set of information from the database based upon second query, the method further includes transmitting a second reply communication to the user based upon the second set of information, thus providing refined results.

In yet other embodiments, a non-transitory computer readable medium having instructions stored thereon is provided. The instructions, when executed by at least one processor, cause a device to perform operations. The operations including receiving a first natural language communication from a user indicative of a user's request; extracting a first intent and first entities from the user's first communication with a natural language processor; and performing a first query of a database based upon the extracted intent and entities. The operations also include receiving information from the database in response to the query; and, transmitting a reply communication to the user over a communication system, the reply communication based upon the received information. In addition as part of search refinement, the operations enabled by the instructions include receiving a second natural language communication from the user; extracting a second intent and second entities from the second communication with the natural language processor; generating an action signal from the extracted second entities; and performing a second query on the database based the first query, second intents and entities and the action signal. The operations still further include receiving a second set of information from the database based upon second query and, then transmitting a second reply communication to the user based upon the second set of information.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
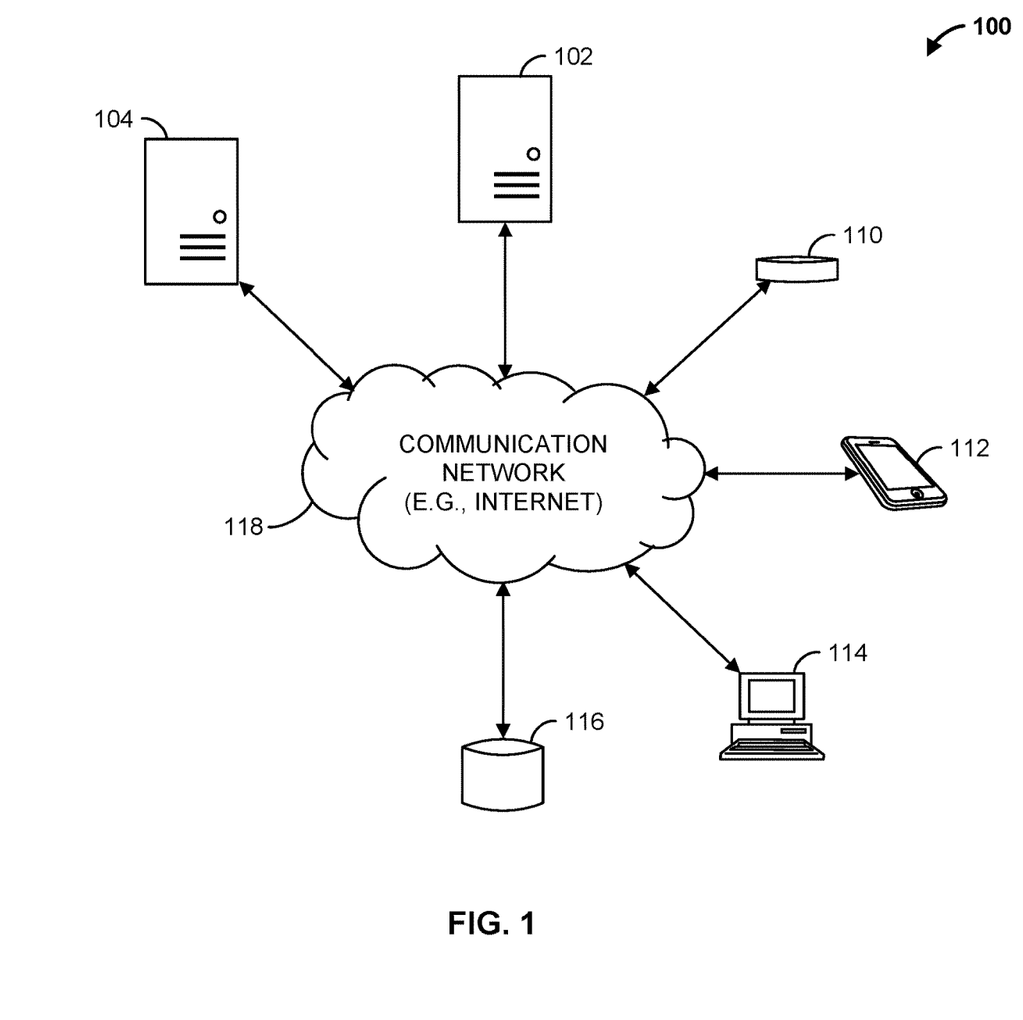
FIG. 1 is a block diagram of communication network used to retrieve and refine relevant information contained in the knowledge base in accordance with some embodiments.

Turning to the drawings, FIG. 1 illustrates a block diagram of a communication system 100 that includes an search refinement computing device 102 (e.g., a server, such as an application server), a web server 104, database 116, and multiple customer computing devices 110, 112, 114 operatively coupled over network 118.

A search refinement computing device 102, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, or through the communication network 118.

In some examples, the search refinement computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, search refinement computing device 102, and web server 104 are operated by a retailer, and multiple customer computing devices 112, 114 are operated by customers of the retailer.

Although FIG. 1 illustrates three customer computing devices 110, 112, 114, advertisement system 100 can include any number of customer computing devices 110, 112, 114. Similarly, the communication system 100 can include any number of workstation(s) (not shown), search refinement computing devices 102, web servers 104, and databases 116 and 117.

The search refinement computing device 102 is operable to communicate with database 116 over communication network 118. For example, search refinement computing device 102 can store data to, and read data from, database 116. Database(s) 116 may be remote storage devices, such as a cloud-based server, a disk (e.g., a hard disk), a memory device on another application server, a networked computer, or any other suitable remote storage. Although shown remote to the search refinement computing device 102, in some examples, database 116 may be a local storage device, such as a hard drive, a non-volatile memory, or a USB stick. The search refinement computing device 102 may store data from workstations or the web server 104 in database 116. In some examples, storage devices store instructions that, when executed by the search refinement computing device 102, allow the search refinement computing device 102 to determine one or more results in response to a user query.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Figure 2:
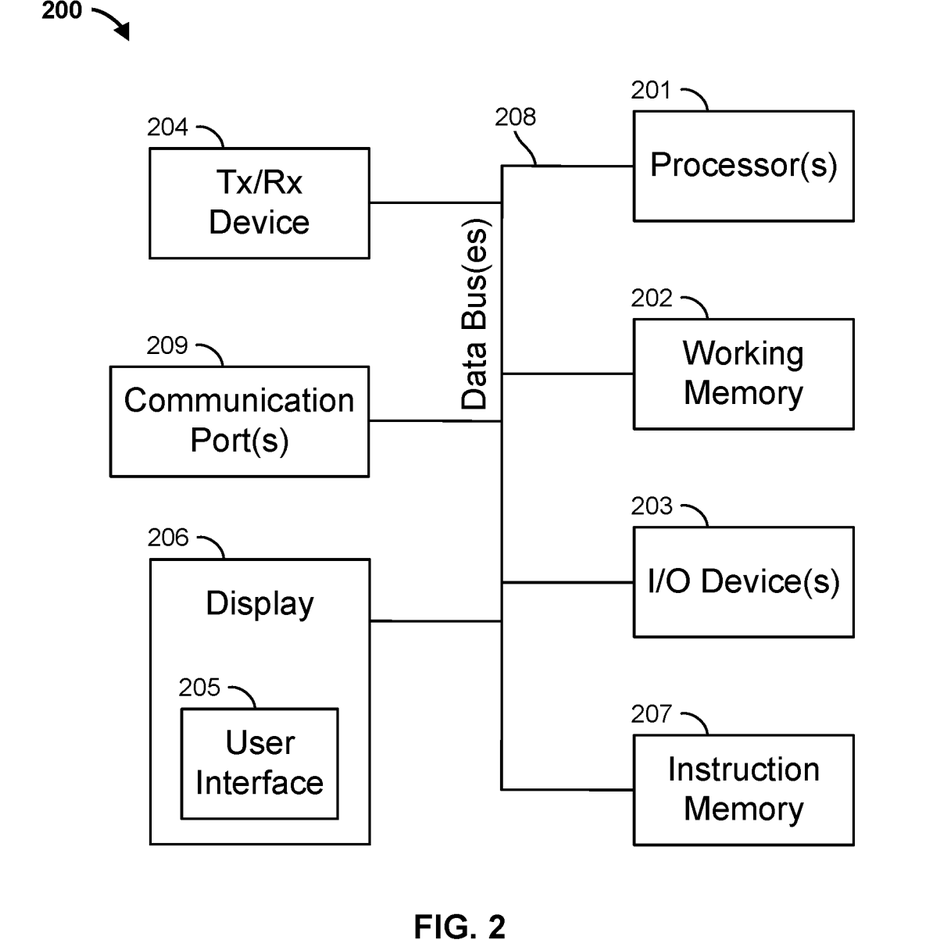
FIG. 2 is a block diagram of the search refinement computing device of the communication system of FIG. 1 in accordance with some embodiments.

FIG. 2 illustrates the search refinement computing device 102 of FIG. 1. The search refinement computing device 102 may include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of search refinement computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with search refinement computing device 102. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 search refinement computing device 102 will be operating in. Processor(s) 201 is operable to receive data from, or send data to, a network, such as communication network 118 of FIG. 1, via transceiver 204.

Figure 3:
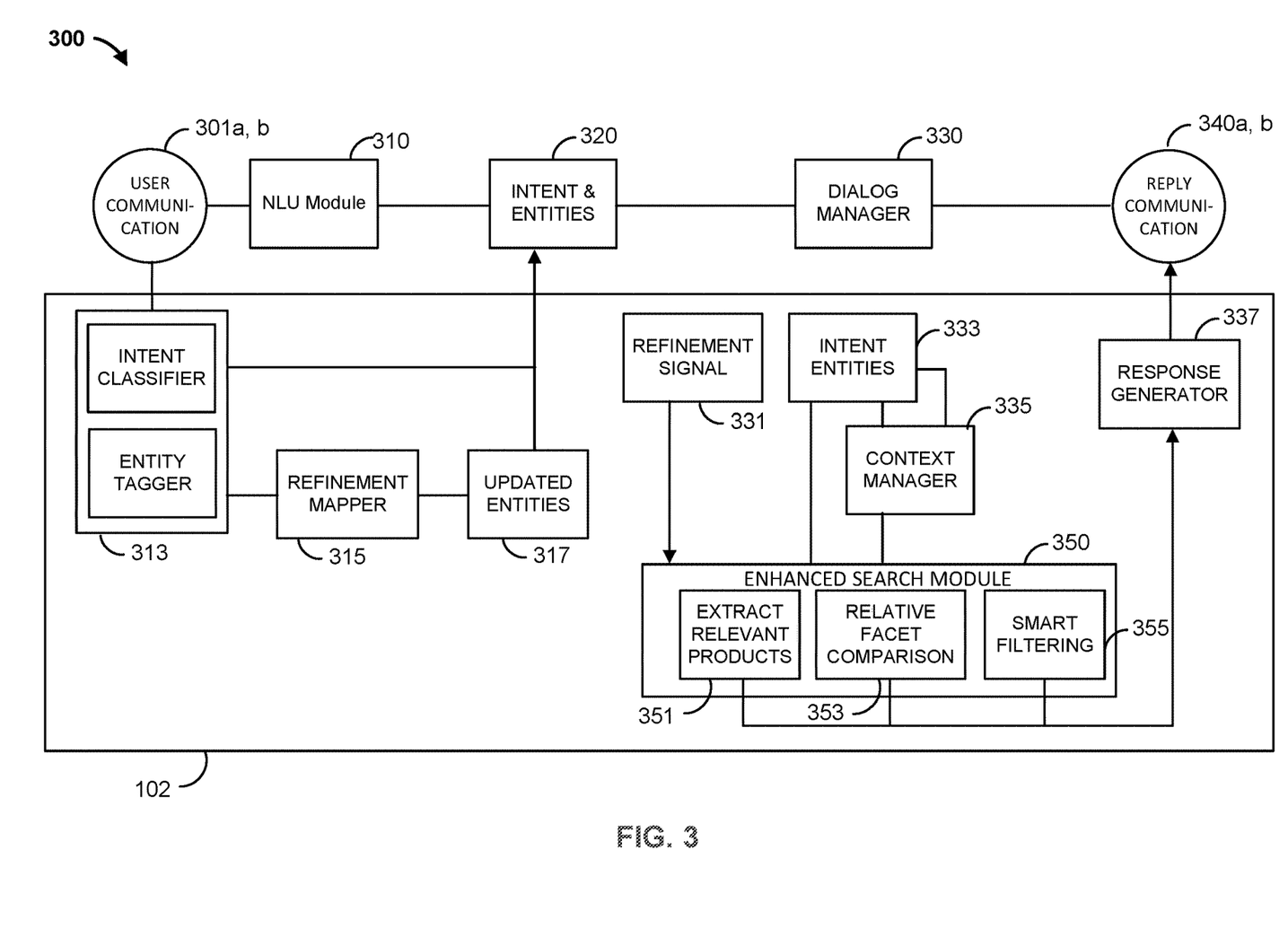
FIG. 3 is a schematic diagram of the search refinement system according to some embodiments.

FIG. 3 is a flow diagram 300 of an exemplary search refinement system according to the disclosed subject matter. A question 301a is presented to the system, via the communication system 118, for example "get me Tropicana® orange Juice." Natural language processing 310 is performed by the search refinement computing device 102. The natural language processing 310 results in an intent of "search products" with product "orange juice" and brand "Tropicana®" in Block 320. A search by the search refinement computing device 102 of a product database 116 results in answer set in which the dialog manager 330 generates a reply communication 340a to the user "I found Tropicana® orange juice 52 fl oz. Would you like me to add that to your cart?"

The user in response to the reply communication 340a may provide additional information, for example "1 want a larger size" in a second communication 301b. Processes undertaken by the search refinement computing device 102 in the natural language understanding module 310 includes classifying the intent and tagging/identifying the entities of the question using a natural language process 313. In the second communication 301b, the intent for example is determined to be change a facet of the search (edit_facet), and the entities extracted include the facet "size" along with a facet descriptor "larger". A facet is typically an attribute, characteristic or feature of product (as in the current example), service or other object/topic. In the refinement mapper 315 the facet descriptor is mapped to a refinement action based on a set of predefined rules. For example if the facet descriptor="larger" or "bigger" then the action is to increase, conversely, if the facet descriptor="smaller" or "less" then the action is to decrease.

Other non-exclusive examples of facets and facet descriptors for illustrative purposes are shown in Table 1.

TABLE 1

| Examples of Facets | Examples of Facet Descriptors |
| --- | --- |
| Brand | Different |
| Unit/size | Other |
| Quantity | Another |
| Type | Larger |
| Color | Smaller |
| Flavor | Bigger |
| Packaging type | Individually sold |
| Nutrition | Best |
| Price | Top |
| Time slot | Most popular |
| Fulfillment type | Best selling |
| Popularity | Top selling |
| Etc. | Cheap |
|  | Cheaper |
|  | Less expensive |
|  | Lighter |
|  | Darker |
|  | Etc. |

Each of the facet descriptors are mapped to an action and included as updated entities as shown in 317. For the above example, the intent and entities determined in the natural language understanding (NLU) module 310 for communication 301b are Intent: edit_facet (change facet) Entities: facet=size; facet descriptor=larger and action=increase.

In the dialog manager 330, the intent, entities as shown in Block 333 and actions (or refinement signals) as shown in Block 331 are provided as inputs to the enhanced search module 350. The content manager 335 determines if the current intent and entities are related to a previous search, and if so also provides the previous entities and preferably the previous query results/recommendation to the enhanced search module 350. If the current output of the NLU module 310 is not related to a previous search then a new search is performed and the enhanced search module may not be invoked.

The enhanced search module 350, in response to the refinement signals provided by block 331, performs one of a plurality of searches. If the refinement signal is SPECIFIC, indicating a specific value of a facet was provided in the user communication, for example "I want the 16 oz size" or "I'd like the great value brand", the facet values being "16 oz"

and "great value" respectively, the enhance search module 350 returns only those products meeting the facet value. Where the first user communication request 301*a* is for "Tropicana® orange juice", in response to the second communication 301*b* of "I want the 16 oz size", the enhanced search engine 350 would return a Tropicana® brand of orange juice in a 16 oz size.

Upon receiving a refinement signal of RELATIVE, indicating a relative facet value, for example an increase in the size of the orange juice product, a comparison search 353 is conducted by the enhanced search module 350. For example, in response to the second communication 301*b* of "I want a larger size" meaning an increase of size desired over the reply communication 340*a* of 52 oz, the enhanced search module 350 would return only those Tropicana® brand orange juice products greater than 52 oz. The search may return Tropicana® orange juice with 89 oz, given that the size is greater than the facet size value of 52 oz.

A third refinement signal of NEGATION, indicating the user requesting a facet value different than the facet value returned in the first reply communication, results in the enhanced search module 350 reformulating its search by smart filtering (filtering out the negated facet value) 355. For example if the user's second communication 301*b* was "Give me a different brand", then the enhanced search module 350 would filter out those orange juice products from Tropicana®.

The search results from the enhanced search module 350, are provided to a response generator, which may rank the results, select one or more to transmit to the user, as well as placing the knowledge base query results into a user friendly response as shown in Block 337. The response generator 337 may use a plurality of predefine templates to generate the response or present a listing of the search results. The generation of a reply may also be advantageously influenced by other information, such as customer historic information obtained from the customer's previous interactions with the refinement system, as well as other retailer information, such as promotions, discounts, inventory etc. The response 340*b* is preferably provided to the user in the same mode as the user communication, i.e. a voice response to a voice question and a text response to a text question.

Figure 4A:
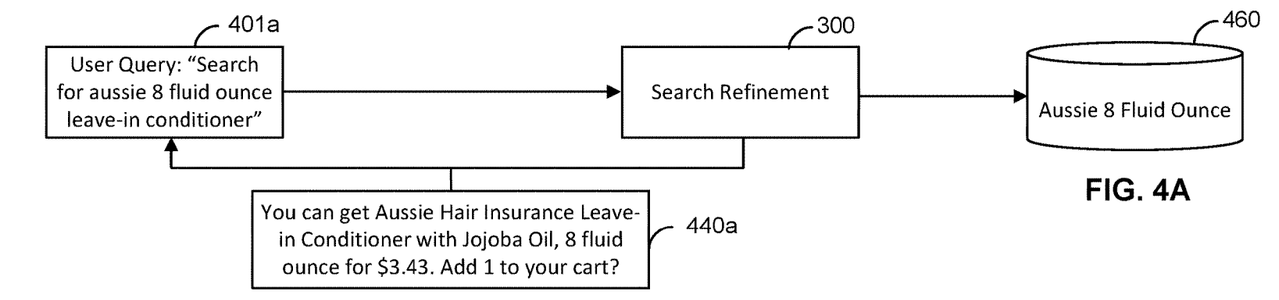
FIGS. 4A, 4B and 4C are flow diagram of a search refinement method in accordance with embodiments of the disclosed subject matter; and, FIG. 5 is a flowchart of a method of refining response information relevant to plural user natural language communications in accordance with embodiments of the disclosed subject matter.
Figure 4B:
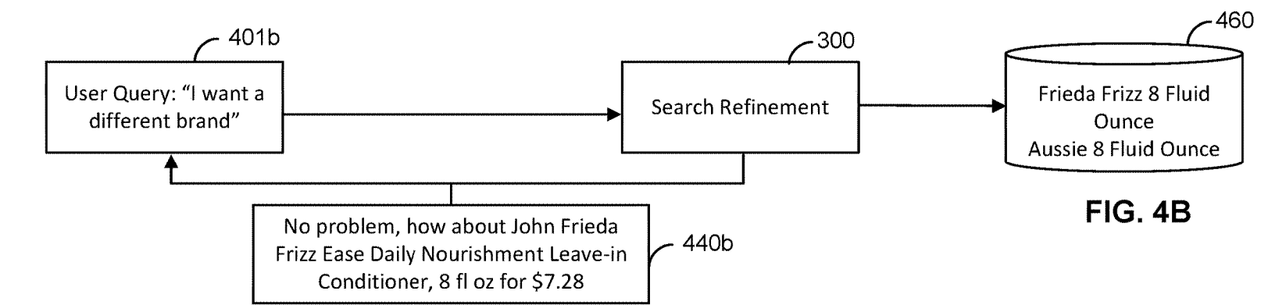
Figure 4C:
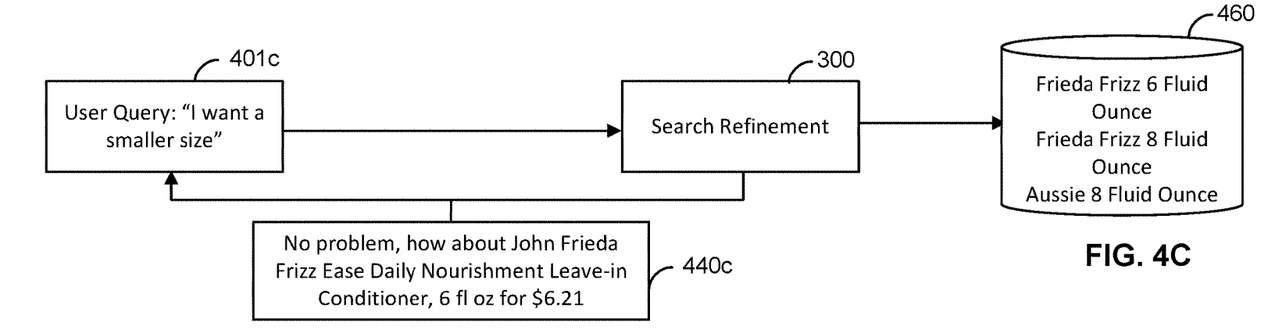

FIGS. 4A, 4B and 4C illustrate an example of the iterative process of the search refinement system 300. A user query 401*a* ("Search for aussie 8 fluid ounce leave-in conditioner") is received in the search refinement system 300 and the refinement signal is that of SPECIFIC, meaning the facet of brand, type and size have been specified. The search refinement system retrieves the products matching the facet values form the database 460, as shown Aussie 8 Fluid Ounce, which is presented in a reply communication 440*a* ("You can get Aussie Hair insurance leave-in Conditioner with Jojob Oil, 8 fluid ounce for $3.43. Add 1 to your cart?") to the user. In response, the user provides a refining communication 401*b* ("I want a different brand") to the search refinement system 300. As discussed above this results in a refinement signal of NEGATION with respect to the brand "Aussie." Thus the reformulated search within the search refinement system 300 filters out relevant products from the "Aussie" brand in the database 460 and returns a query result of Frieda Frizz 8 fluid ounce leave-in conditioner product. The second reply communication 440*b* ("No problem, how about Frieda Frizz ease Daily Nourishment leave-in conditioner, 8 fl oz for 7.28.") to the user.

In FIG. 4C, the user communication 401*c* ("I want a smaller size") is determined to be a request to edit the facet of size, with the facet descriptor being "smaller" and the refinement signal being RELATIVE. The search refinement system 300 in response to the refinement signal performs a facet comparison search for Frieda Frizz leave-in conditioner products having a size less than 8 oz. The result of the query Frieda Frizz 6 Fluid Ounce, is transmitted to the user in a third reply communication 440*c* ("No problem, how about John Frieda Frizz Ease Daily Nourishment Leave-in Conditioner, 6 fl oz for $6.21.")

Figure 5:
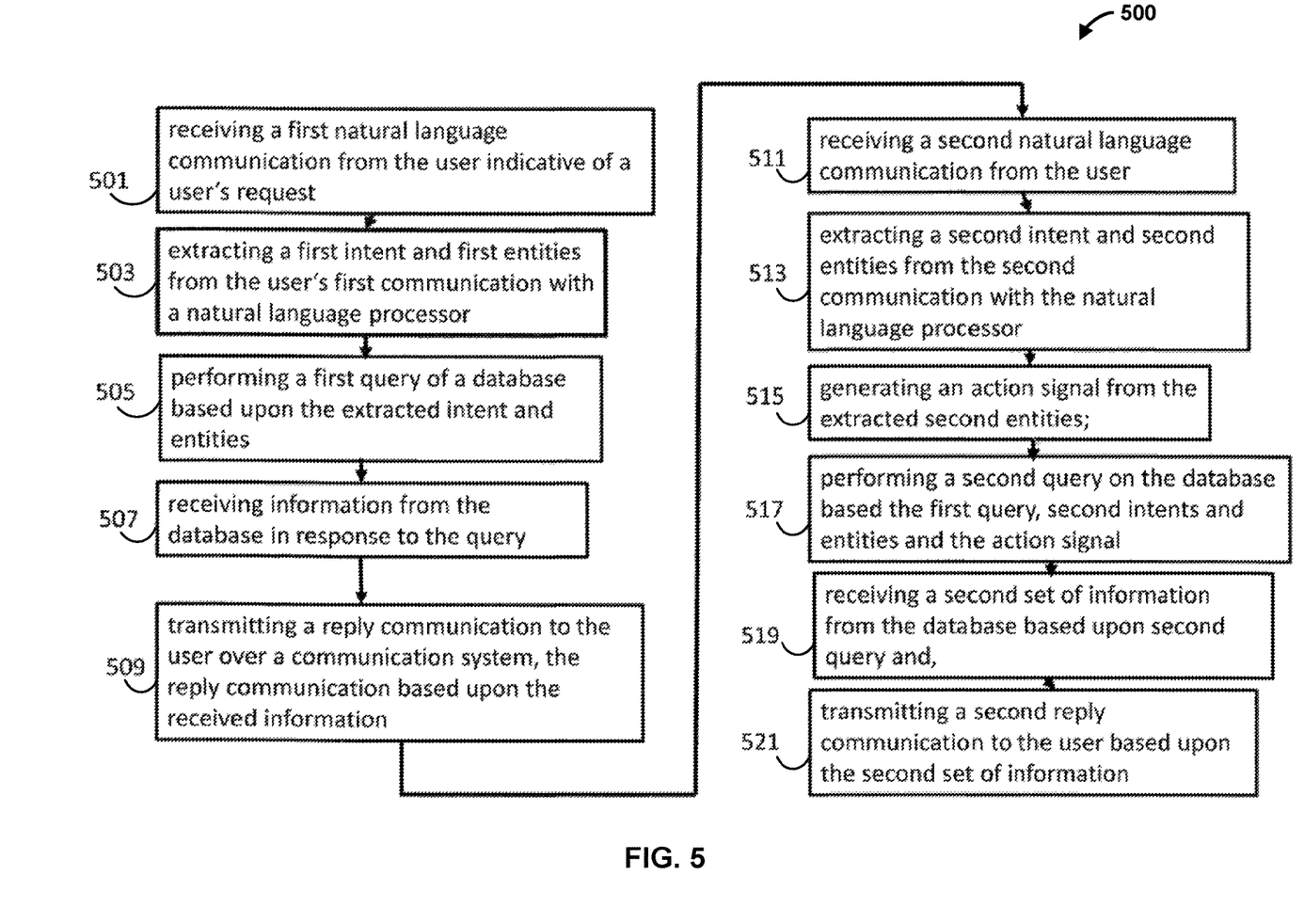

Turning to FIG. 5, is a method 500 in an automated assistant for refining response information relevant to plural user natural language communications is shown. In Block 501, the search refinement system (i.e. automated assistant) receives the user's natural language question/query/communication over the communication system 118. The user may present the communication via voice or text for example to an automated shopping assistant. The natural language processing module 310 extracts a first intent and first entities from the user's first communication as shown in Block 503. A first query of a database based upon the extracted intent and entities as shown in Block 505. In Block 507 information from the database is received in response to the first query and a reply communication based upon the received information is transmitted to the user as shown in Block 509.

The method 500 further includes receiving a second natural language communication from the user as shown in Block 511, typically as described previously, the second communication is a refining statement in reference to the reply communication. A second intent and second entities from the second communication are extracted with the natural language processor as shown in Block 513. Using the second intent and entities, an action signal is generated as shown in Block 517 and a second query is performed based upon the first query, second intents and entities and the action signal as shown in Block 517. The type of search performed in the method is selected as a function of the action signal/refinement signal as discussed previously. Additionally, the second query may also be based upon the reply communication, for example when a specific product or facet is recommended in the reply. It is important to note that if there is a determination, that the second communication is not related to the first query, a new search is performed without the use of the previous query or other features associated with the previous query. A second set of information from the database based upon second query and a second reply communication to the user based upon the second set of information is transmitted to the user as shown in Blocks 519 and 521, respectively. Steps 511 through 521 may be repeated upon receipt of a follow-up user communication, as described in detail with respect to FIG. 4 above.

Aspects of the disclosed subject matter serve to connect the user to the item/product they want by reducing the number of tries it takes them to get there, thus enhancing the user's experience and avoiding the frustrations with prior search processes. Additionally noise in the training data is reduced in the disclosed search refinement making entity capture & accuracy more accurate. More over guided navigation and query completion are enabled, as well as deeper product related questions about nutritional info, form & function, usage, occasion, etc.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system for retrieving relevant information from a knowledge base in response to successive user natural language communications comprising:
    a communication system;
    a database containing the knowledge base; and,
    a computing device operably connected to the database and the communication system, the computing device configured to:
        receive, over the communication system from a user, a first natural language communication indicative of a request of the user;
        extract a first intent and first entities from the first natural language communication;
        perform a first query of the database based upon the first intent and the first entities;
        receive information from the database in response to the first query;
        transmit, based upon the received information, a reply communication to the user, over the communication system;
        receive a second natural language communication from the user;
        extract a second intent and second entities from the second natural language communication;
        generate an action signal from the second entities;
        perform a second query based on at least the first query, the second intent, the second entities and the action signal;
        receive a second set of information from the database based upon the second query; and,
        transmit a further communication to the user based upon the second set of information.

2. The system of claim 1, wherein the second query is also based upon the reply communication.

3. The system of claim 1, wherein the action signal is selected from the group consisting of specific, relative and negation.

4. The system of claim 1, wherein a type of the second query is a function of the action signal.

5. The system of claim 1, wherein the second natural language communication includes a specific facet value and the second query is an exact facet match for relevant products with the specific facet value when the action signal is specific.

6. The system of claim 1, wherein the reply communication includes a facet value and the second natural language communication includes a relative facet description and the second query compares facet values of relevant products with the facet value of the reply communication when the action signal is relative.

7. The system of claim 1, wherein the second natural language communication is received subsequent to the reply communication.

8. The system of claim 1, wherein the computing device is further configured to determine if the second intent and the second entities are related to the first query.

9. The system of claim 1, wherein the computing device further comprises a natural language processor.

10. The system of claim 1, wherein the computing device comprises an online shopping assistant.

11. A method of refining response information relevant to plural user natural language communications, comprising:
    receiving, from a user, a first natural language communication indicative of a request of the user;
    extracting a first intent and first entities from the first natural language communication with a natural language processor;
    performing a first query of a database based upon the first intent and the first entities;
    receiving information from the database in response to the first query;
    transmitting, based upon the received information, a first reply communication to the user over a communication system;
    receiving a second natural language communication from the user;
    extracting a second intent and second entities from the second natural language communication with the natural language processor;
    generating an action signal from the second entities;
    performing a second query based on at least the first query, the second intent, the second entities and the action signal;
    receiving a second set of information from the database based upon the second query; and,
    transmitting a second reply communication to the user based upon the second set of information.

12. The method of claim 11, wherein the second query is further based on the first reply communication.

13. The method of claim 11, wherein the action signal is selected from the group consisting of specific, relative and negation.

14. The method of claim 11, further comprising:
    receiving a third natural language communication from the user;
    extracting a third intent and third entities from the third natural language communication with the natural language processor;
    generating a second action signal from the third entities;
    performing a third query on the database based upon the first query, the second query, the third intent, the third entities and the second action signal;
    receiving a third set of information from the database based upon the third query; and, transmitting a third reply communication to the user based upon the third set of information.

15. The method of claim 11, wherein the second natural language communication includes a specific facet value and the second query is an exact facet match for relevant products with the specific facet value when the action signal is specific.

16. The method of claim 11, wherein the first reply communication includes a facet value and the second natural language communication includes a relative facet description and the second query compares facet values of relevant products with the facet value of the first reply communication when the action signal is relative.

17. The method of claim 11, wherein the second natural language communication is received subsequent to the first reply communication.

18. The method of claim 11, further comprising determining if the second intent and the second entities are related to the first query.

19. The method of claim 11, wherein the method is performed by an online shopping assistant.

20. A non-transitory computer readable medium having instructions stored thereon, wherein the instructions, when executed by at least one processor, cause a device to perform operations comprising:

receiving, from a user, a first natural language communication indicative of a request of the user;

extracting a first intent and first entities from the first natural language communication with a natural language processor;

performing a first query of a database based upon the first intent and the first entities;

receiving information from the database in response to the first query;

transmitting, based upon the received information, a first reply communication to the user over a communication system;

receiving a second natural language communication from the user;

extracting a second intent and second entities from the second natural language communication with the natural language processor;

generating an action signal from the second entities;

performing a second query based on at least the first query, the second intent, the second entities and the action signal;

receiving a second set of information from the database based upon the second query; and, transmitting a second reply communication to the user based upon the second set of information.

* * * * *